(12) United States Patent
Panzarella

(10) Patent No.: US 9,114,756 B1
(45) Date of Patent: Aug. 25, 2015

(54) VEHICLE LIGHTING SYSTEM

(71) Applicant: Richard G Panzarella, South Plainfield, NJ (US)

(72) Inventor: Richard G Panzarella, South Plainfield, NJ (US)

( * ) Notice: Subject to any disclaimer, the term of this patent is extended or adjusted under 35 U.S.C. 154(b) by 0 days.

(21) Appl. No.: 14/522,886

(22) Filed: Oct. 24, 2014

(51) Int. Cl.
*B60Q 1/00* (2006.01)
*B60Q 1/14* (2006.01)
*B60Q 1/20* (2006.01)

(52) U.S. Cl.
CPC .............. *B60Q 1/143* (2013.01); *B60Q 1/0088* (2013.01); *B60Q 1/20* (2013.01)

(58) Field of Classification Search
CPC ......... B60Q 1/0088; B60Q 1/143; B60Q 1/20
USPC .......... 362/464, 543–555, 276, 802; 307/10.8
See application file for complete search history.

(56) References Cited

U.S. PATENT DOCUMENTS

| | | | | |
|---|---|---|---|---|
| 2,375,677 A | * | 5/1945 | Moore | 315/83 |
| 4,280,062 A | * | 7/1981 | Miller et al. | 315/82 |
| 5,473,515 A | * | 12/1995 | Liu | 362/466 |
| 5,841,203 A | * | 11/1998 | Chambers et al. | 307/10.8 |
| 6,265,829 B1 | * | 7/2001 | Perdec | 315/82 |
| 6,929,388 B2 | * | 8/2005 | Campbell et al. | 362/467 |
| 7,825,534 B2 | * | 11/2010 | Spear | 307/10.8 |
| 2005/0057937 A1 | * | 3/2005 | Tsai | 362/464 |

\* cited by examiner

*Primary Examiner* — Thomas M Sember
(74) *Attorney, Agent, or Firm* — Gulf Coast Intellectual Property Group

(57) ABSTRACT

A lighting assembly operable to be placed in the headlight unit of a motor vehicle that is operable to emit a first color and second color dependent upon environmental conditions. The lighting assembly includes a harness plug that is configured to operably couple the lighting assembly to the electrical system of a motor vehicle. A CPU is disposed within the harness plug. A base plug is operably coupled to the harness plug and includes a photo sensor and a fog sensor. A bulb base is operably coupled to the base plug and includes a first light bulb and a second light bulb. The lighting assembly includes a first operational mode that illuminates the first bulb subsequent the detection of fog. A second operational mode and third operational mode are controlled by the photo sensor and is dependent upon the absence or presence of ambient light.

19 Claims, 2 Drawing Sheets

VEHICLE LIGHTING SYSTEM

FIELD OF THE INVENTION

The present invention relates generally to vehicle lighting systems, more specifically but not by way of limitation, a lighting assembly operable to be placed in the headlight of a vehicle wherein the lighting assembly produces a first color and a second color and wherein the lighting assembly is operable to detect environmental conditions such as but not limited to ambient light and fog.

BACKGROUND

Vehicles such as automobiles and trucks are required to have certain lights and lighting systems in order to be compliant with safety regulations. A conventional lighting system will include turn indicator lights, brake lights and headlights. All of these are required in order to operate a vehicle on public roads. The headlights of a vehicle are utilized during night and low light conditions and provide visibility of the area immediately in front of the vehicle for the driver. Conventional headlights illuminate several hundred feet in front of the vehicle and are further utilized to provide visual signals to approaching vehicle allowing drivers to operate safely.

One problem with conventional headlights is the generation of only one light wavelength. Most headlights generate a single wavelength spectrum such as but not limited to white. The white light is a mixture of the colors of the visible light spectrum and cannot be seen in daylight conditions from as far away when compared to a single light wave that is at the higher end of the range of visible light spectrum.

Another issue with conventional headlights is their inability to react to and change operational modes based on environmental conditions. Drivers will typically encounter adverse driving conditions such as but not limited to fog. Conventional vehicle lighting systems do not provide any measurement of the fog nor any subsequent operation of the headlight once adverse driving conditions have been detected.

Accordingly, there is a need for a headlight lighting assembly that can be operably coupled to a headlight of a vehicle wherein the headlight lighting assembly is operable to provide a first mode and second mode of operation during ambient light conditions and night time conditions and wherein the headlight assembly is further operable to detect adverse conditions such as but not limited to fog and provide activation of a light of the headlight lighting assembly.

SUMMARY OF THE INVENTION

It is the object of the present invention to provide a vehicle headlight lighting assembly that includes a first bulb and a second bulb that are operational in a first mode and second mode dependent upon the environmental conditions.

Another object of the present invention is to provide a vehicle headlight lighting assembly having a first operational mode and a second operational mode wherein in the first operational mode the headlight lighting assembly is operable to operate a first bulb that produces a first color.

An alternative object of the present invention is to provide a vehicle headlight lighting assembly having a first operational mode and a second operational mode wherein in the second operational mode the headlight lighting assembly is operable to illuminate a second bulb that produces a second color.

A further object of the present invention is to provide a vehicle headlight lighting assembly having a first and second operational mode that further includes a transmitter and a receive in a base plug that is operable to detect adverse driving conditions such as but not limited to fog.

An added object of the present invention is to provide a vehicle headlight lighting assembly having a first and second operational mode that further includes a photo sensor on the base plug wherein the photo sensor is operable to activate the second operational mode subsequent to detection of sufficient ambient light.

Still a further object of the present invention is to provide a vehicle headlight lighting assembly having a first bulb and a second bulb wherein the second color produced by the second bulb is amber.

An additional object of the present invention is to provide a vehicle headlight lighting system having a first operational mode and a second operational mode wherein the transmitter in the base plug is operable to produce a light beam and wherein the transmitter is angled away from the receiver in the base plug.

Yet another object of the present invention is to provide a vehicle headlight lighting assembly having a first operational mode and a second operational mode that includes a central processing unit having the necessary electronics to store, receive, transmit and process the data required to operate the headlight lighting assembly.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
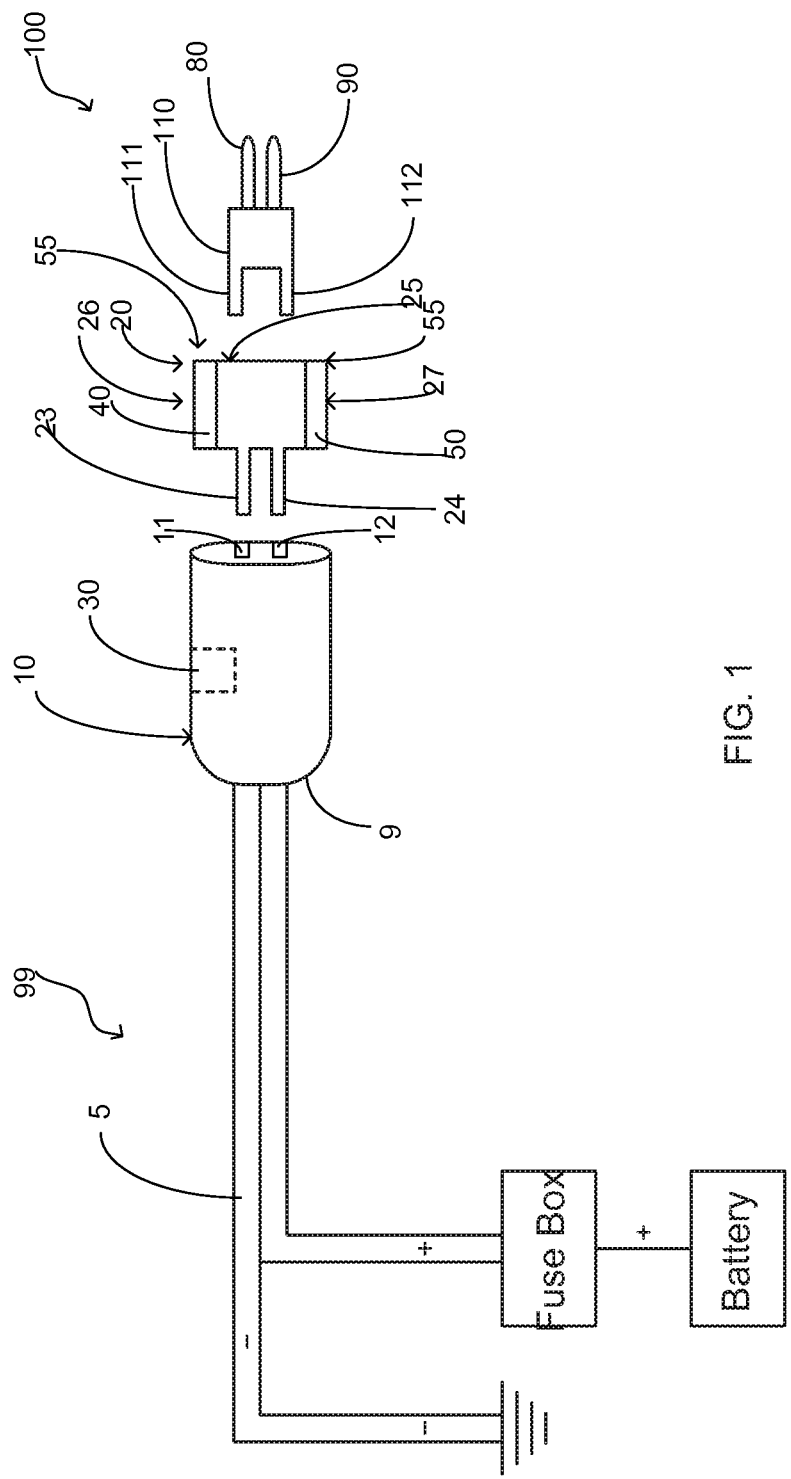
FIG. 1 is a diagrammatic view of the present invention.
Figure 2:
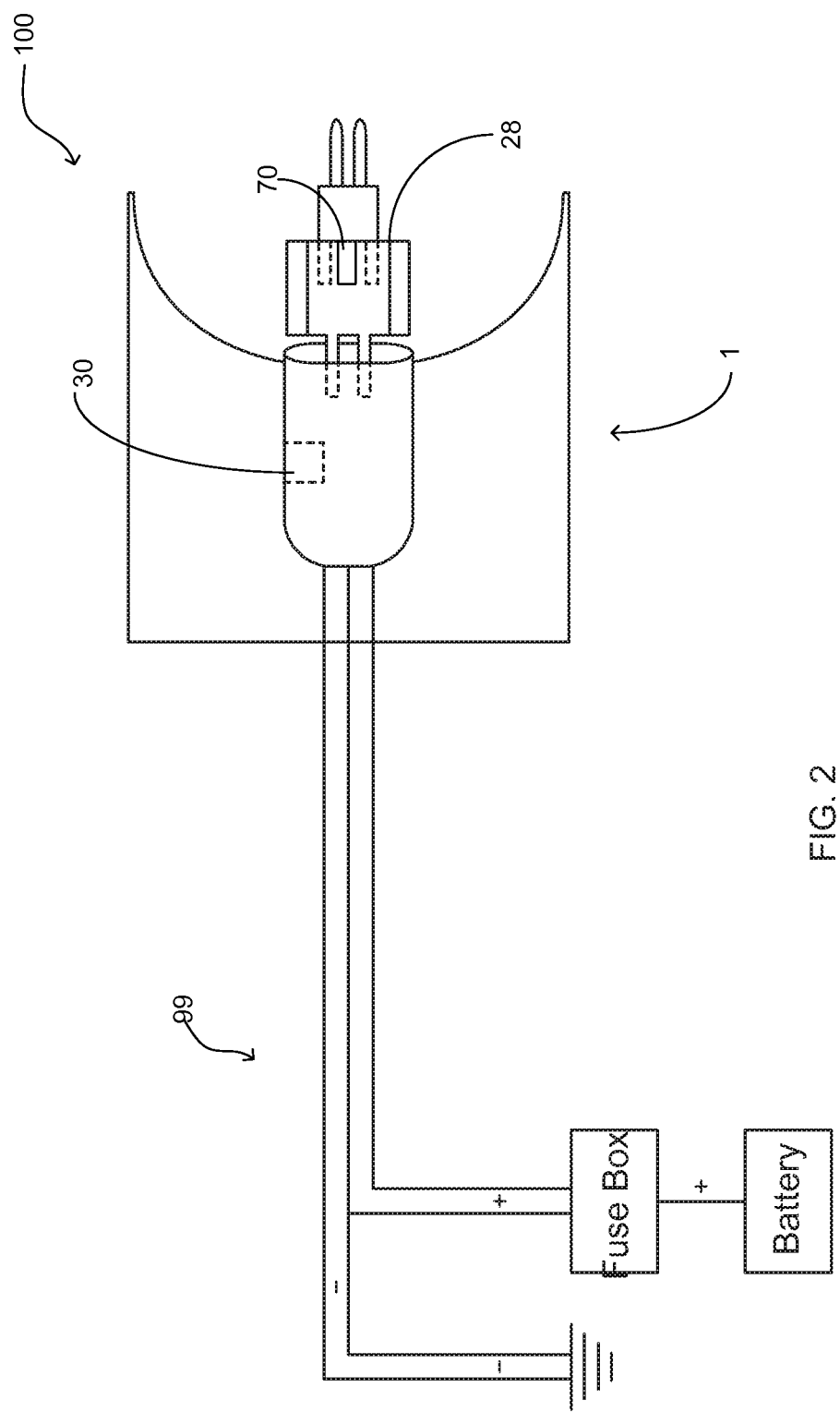
FIG. 2 is a diagrammatic view of the present invention placed in a conventional headlight cavity.

Referring now to the drawings submitted herewith, wherein various elements depicted therein are not necessarily drawn to scale and wherein through the views and figures like elements are referenced with identical reference numerals, there is illustrated a headlight lighting assembly 100 constructed according to the principles of the present invention.

Referring in particular to FIG. 1 herein, the headlight lighting assembly 100 includes a harness plug 10 that is operably coupled to an electrical system 99 of a vehicle using wire 5. Harness plug 10 includes female sockets 11, 12 that are operable to electrically couple with the male prongs 23,24 of the base plug 20. The harness plug 10 includes body 9 that is manufactured from a suitable durable material such as but not limited to plastic. The body 9 of the harness plug 10 includes an interior cavity (not illustrated herein) that is suitable in size so as to accommodate the central processing unit 30. The central processing unit 30 is secured within the interior cavity of the body 9 utilizing suitable durable techniques. The central processing unit 30 contains the necessary electronics to store, receive, transmit and manipulate data in order to facilitate the operation of the headlight lighting assembly 100.

While in the preferred embodiment, the central processing unit 30 is mounted within the harness plug 10 so as to provide retrofit capabilities for the headlight lighting assembly 100, it is contemplated within the scope of the present invention that the central processing unit 30 could be included and/or mounted to another component of a vehicles electrical system.

The headlight lighting assembly 100 further includes a base plug 20. The base plug 20 is configured to operably couple to the harness plug 10. In the preferred embodiment illustrated herein the base plug 20 includes male prongs 23, 24 that are configured to be inserted into female sockets 11, 12. While the aforementioned technique and elements for coupling the base plug 20 to the harness plug 10 is illustrated and described for the preferred embodiment, it is contemplated within the scope of the present invention that the base plug 20 and harness plug 10 could be configured to operably couple using numerous suitable techniques. The base plug 20 includes body 25 that is square in shape being manufactured from a suitable durable material such as but not limited to plastic. The base plug 20 includes a first side 26 and a second side 27. Secured to the first side 26 and second side 27 are the receiver 40 and transmitter 50 of the fog sensor 55. The fog sensor 55 is operably coupled to the central processing unit 30 and is operable to illuminate the first bulb 80 subsequent detection of fog or moisture in the atmosphere in front of the vehicle in which the headlight lighting assembly 100 is installed. The transmitter 50 of the fog sensor 55 projects a light beam (of a non-visible spectrum) outward from the headlight assembly 1. The transmitter 50 is mounted within the base plug 20 such that it is angular in manner with respect to the receiver 40. The angled orientation of the transmitter 50 ensures that the light beam emitted therefrom is only detected when fog or smoke particles are in the air in front of the vehicle and the scattered reflection therefrom is then detected by the receiver 40. The angular mounting of the transmitter 50 is required in to prevent the activation of the first bulb 80 during normal driving conditions where no fog or smoke is present.

The fog sensor 55 is operably coupled to the central processing unit 30 and controls the first mode of operation of the headlight lighting assembly 100. In the first mode of operation, as a vehicle having the headlight lighting assembly travels in a forward direction the transmitter 50 continuously emits a non-visible light beam in the direction that the vehicle is traveling. In the presence of particles such as but not limited to fog or smoke, that could present adverse driving conditions, the light beam from the transmitter 50 is scatter and some of the light beam is reflected back and detected by the receiver 40. Subsequent the receiver 40 detecting light particles from the transmitter 50, a signal is transmitted to the central processing unit 30 wherein the central processing unit 30 illuminates the first bulb 80. The first bulb 80 is a conventional light bulb such as but not limited to an LED bulb and is configured to emit a first color. While no particular color is required, good results have been achieved utilizing a first bulb 80 that emits a white color spectrum. The headlight lighting assembly 100 continues to illuminate the first bulb 80 as the receiver 40 continues to detect at least a portion of the light beam being emitted from the transmitter 50.

The base plug 20 further includes a photo sensor 70. The photo sensor 70 is secured to the base plug 20 utilizing suitable durable techniques. The photo sensor 70 is mounted at the forward edge 28 of the base plug and is operable to detect the presence of ambient light so as to control the second mode of operation of the headlight lighting assembly 100. The photo sensor 70 is a conventional photo sensor and is operable to detect visible light spectrums and can utilize a photodiode, phototransistor or other suitable element to detect the visible light spectrum. The photo sensor 70 will transmit a signal to the central processing unit 70 subsequent the detection of visible light, in this case daylight, and the central processing unit 30 will then illuminate the second bulb 90. The second bulb 90 is operable to increase the visibility of the vehicle in which the headlight lighting assembly 100 is mounted. The second bulb 90 is configured to emit a longer wavelength visible light such as but not limited to amber. It is desired within the scope of the present invention that the second bulb 90 is configured to emit a light wavelength that is within the range of 580 nm to 600 nm. The aforementioned wavelength provides greater visibility than shorter wavelengths and is operable to assist in the improved visibility of the vehicle in which the headlight lighting assembly 100 is mounted. While a particular wavelength has been described herein for the second bulb 90, it should be recognized that the second bulb 90 could be configured to emit various different wavelengths in order to accomplish the desired functionality described herein.

The photo sensor 70 is further operable to control the third mode of operation of the headlight lighting assembly 100. In the third mode of operation, the photo sensor 70 detects the absence of ambient light, nighttime, and transmits a signal to the central processing unit 30 wherein the central processing unit 30 will then illuminate the first bulb 80 providing the necessary lighting for a vehicle to operate safely at night.

Photo sensor 70 is additionally operable to control a fourth mode of operation for the headlight lighting assembly 100. In the fourth mode of operation of the headlight lighting assembly 100, the photo sensor is programmed by the central processing unit 30 to detect high beam illumination from an oncoming vehicle. Subsequent detection of high beam illumination from an oncoming vehicle, the photo sensor 70 will transmit a signal to the central processing unit 30 wherein the central processing unit 30 will perform the necessary steps to illuminate either the first bulb 80 and/or the second bulb 90 wherein the first bulb 80 and/or the second bulb 90 is illuminated in a rapid blinking pattern for at least two seconds. The illumination blinking pattern functions to provide notification to the oncoming vehicle to eliminate their high beam illumination. Subsequent the blinking pattern illumination of either the first bulb 80 and/or the second bulb 90 the photo sensor 70 will continue to monitor for the presence of the high beam illumination from an oncoming vehicle. Once the high beam illumination is no longer detected, the headlight lighting assembly 100 resumes operation as described herein. If continued detection of high beam illumination is detected from an oncoming vehicle then the central processing unit 30 will initiate the blinking sequence at least once more and if subsequent detection continues then the central processing unit 30 will increase the illumination intensity of either the first bulb 80 and/or the second bulb 90.

The first bulb 80 and second bulb 90 are secured to the bulb base 110. The bulb base 110 includes male prongs 111,112 that are operable to couple with female sockets (not illustrated herein) integrally formed in the base plug 20. The aforementioned coupling technique provides the electrical and operational connection required to facilitate the functionality described herein. While the male prongs 111, 112 are illustrated and described herein as the preferred technique for operably coupling the bulb base 110 to the base plug 20, it is contemplated within the scope of the present invention that numerous techniques could be utilized to operably couple the bulb base 110 to the base plug 20. The first bulb 80 and second bulb 90 are releasably secured to the bulb base 110 so as to facilitate the replacement thereof in the event of a failure.

The headlight lighting assembly 100 in its preferred embodiment is configured to replacement conventional headlight bulbs with the ability to be retrofit into numerous makes and models of vehicles.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A headlight lighting assembly comprising:
    a harness plug, said harness plug having a body, said body having an interior volume, said harness plug configured to operably couple with a twelve volt DC electrical system of a vehicle;
    a base plug, said base plug configured to operably couple with said harness plug,
    a photo sensor, said photo sensor being integrally secured to said base plug, said photo sensor operable to control at least one operational mode of the headlight lighting assembly;
    a bulb base, said bulb base being configured to operably couple to said base plug, said bulb base having a first bulb and a second bulb, said first bulb emitting visible light of a first color, said second bulb emitting visible light of a second color;
    a central processing unit, said central processing unit being mounted within the interior volume of said harness plug, said central processing unit having the necessary electronics to store, receive, transmit and manipulate data, said central processing unit operably coupled to said base plug and said bulb base; and
    wherein the headlight lighting assembly has a first, second and third operational mode, wherein the second and third operational mode are controlled by said photo sensor.

2. The headlight lighting assembly as recited in claim 1, and further including an adverse weather sensor, said adverse weather sensor operable to detect particles in the atmosphere forward of the headlight lighting assembly, said adverse weather sensor operable to control the first operational mode of the headlight lighting assembly.

3. The headlight lighting assembly as recited in claim 2, wherein said adverse weather sensor further including a transmitter and a receiver, said transmitter operable to emit a non-visible light wave, said receiver being operable to detect reflected light waves emitted by said receiver.

4. The headlight lighting assembly as recited in claim 3, wherein said transmitter is mounted in an angular manner to said receiver in said base plug.

5. The headlight lighting assembly as recited in claim 4, wherein in said second mode, the headlight lighting assembly is operable to illuminate said second bulb subsequent the detection of ambient light by said photo sensor.

6. The headlight lighting assembly as recited in claim 5, wherein said second bulb is configured to emit a light within the visible spectrum of 580 nm to 600 nm.

7. The headlight lighting assembly as recited in claim 6, wherein said first bulb is configured to emit a white light.

8. A headlight lighting assembly for a vehicle operable to display a first color and a second color depending upon environmental conditions comprising:
    a harness plug, said harness plug having a body, said body having an interior volume, said harness plug configured to operably couple with a twelve volt DC electrical system of a vehicle;
    a base plug, said base plug configured to operably couple with said harness plug, said base plug having a first side and a second side, said base plug being square in shape,
    a photo sensor, said photo sensor being integrally secured to said base plug, said photo sensor operable to control at a second and a third operational mode of the headlight lighting assembly;
    a fog sensor, said fog sensor being mounted to said base plug, said fog sensor operable to detect fog in front of a vehicle in which the headlight lighting assembly is mounted, said fog sensor operable to control a first operational mode of the headlight lighting assembly;
    a bulb base, said bulb base being configured to operably couple to said base plug, said bulb base having a first bulb and a second bulb, said first bulb emitting visible light of a first color, said second bulb emitting visible light of a second color;
    a central processing unit, said central processing unit being mounted within the interior volume of said harness plug, said central processing unit having the necessary electronics to store, receive, transmit and manipulate data, said central processing unit operably coupled to said base plug and said bulb base; and
    wherein the headlight lighting assembly in said second operational mode is configured to illuminate said second bulb.

9. The headlight lighting assembly as recited in claim 8, wherein said second operational mode said photo sensor has detected the presence of ambient light.

10. The headlight lighting assembly as recited in claim 9, wherein in said third operational mode said photo sensor has detected the absence of ambient light and transmitted a signal to the central processing unit to illuminate said first bulb.

11. The headlight lighting assembly as recited in claim 10, wherein said fog sensor further includes a transmitter and a receiver, said transmitter of said fog sensor being mounted on said first side of said base plug, said receiver of said fog sensor being mounted on said second side of said base plug, said transmitter being mounted angularly with respect to said receiver.

12. The headlight lighting assembly as recited in claim 11, wherein in said first operational mode said fog sensor is operable to transmit a signal to the central processing unit to illuminate said first bulb subsequent detection of fog.

13. The headlight lighting assembly as recited in claim 12, wherein said first bulb emits a light white in color and said second bulb emits a light amber in color.

14. A lighting assembly mounted within a headlight unit of a motor vehicle operable to provide light in a first color and a second color comprising:
    a harness plug, said harness plug having a body, said body having an interior volume, said harness plug configured to operably couple with a twelve volt DC electrical system of a vehicle;

a base plug, said base plug configured to operably couple with said harness plug, said base plug having a first side and a second side, said base plug being square in shape, said base plug having a forward edge;

a photo sensor, said photo sensor being integrally secured to said base plug proximate said forward edge thereof, said photo sensor operable to control at a second and a third operational mode of the headlight lighting assembly;

a fog sensor, said fog sensor being mounted to said base plug, said said fog sensor having a transmitter and a receiver, said transmitter of said fog sensor being mounted on said first side of said base plug, said receiver of said fog sensor being mounted on said second side of said base plug, said transmitter being mounted angularly with respect to said receiver, said fog sensor operable to detect fog in front of a motor vehicle in which the lighting assembly is mounted, said fog sensor operable to control a first operational mode of the lighting assembly;

a bulb base, said bulb base being configured to operably couple to said base plug, said bulb base having a first bulb and a second bulb, said first bulb emitting visible light of a first color, said second bulb emitting visible light of a second color;

a central processing unit, said central processing unit being mounted within the interior volume of said harness plug, said central processing unit having the necessary electronics to store, receive, transmit and manipulate data, said central processing unit operably coupled to said base plug and said bulb base; and wherein the lighting assembly has a first, second and third operational mode, said second operational mode operable to illuminate said second bulb.

15. The lighting assembly as recited in claim 14, wherein in said first operational mode said fog sensor is operable to transmit a signal to the central processing unit to illuminate said first bulb subsequent detection of fog.

16. The lighting assembly as recited in claim 15, wherein in said third operational mode said photo sensor has detected the absence of ambient light and transmitted a signal to the central processing unit to illuminate said first bulb.

17. The lighting assembly as recited in claim 14, wherein said second bulb is configured to emit a light within the visible spectrum of 580 nm to 600 nm.

18. The lighting assembly as recited in claim 17, wherein said first bulb emits a light white in color.

19. The lighting assembly as recited in claim 14, wherein said second bulb emits a light amber in color.

* * * * *